US012712382B2

(12) United States Patent
Savanth et al.

(10) Patent No.: US 12,712,382 B2
(45) Date of Patent: Aug. 18, 2026

(54) DEVICE AND/OR METHOD FOR POWER-DEPENDENT TUNING FOR ENERGY HARVESTING

(71) Applicant: Arm Limited, Cambridge (GB)

(72) Inventors: Parameshwarappa Anand Kumar Savanth, Cambridge (GB); Sahan Sajeewa Hiniduma Udugama Gamage, Cambridge (GB); Thanusree Achuthan, Great Cambourne (GB); Pranay Prabhat, Cambridge (GB); Mahmoud Ashraf Hassan Wagih Mohamed, Southampton (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/535,286

(22) Filed: Nov. 24, 2021

(65) Prior Publication Data

US 2023/0163630 A1 May 25, 2023

(51) Int. Cl.

*H02J 50/00* (2016.01)
*G06K 19/077* (2006.01)
*H02J 50/27* (2016.01)

(52) U.S. Cl.

CPC ...... *H02J 50/001* (2020.01); *G06K 19/07788* (2013.01); *H02J 50/27* (2016.02)

(58) Field of Classification Search

CPC .......... H02J 50/001; H02J 50/10; H02J 50/12; H02J 50/27; H02J 50/80

See application file for complete search history.

(56) References Cited

U.S. PATENT DOCUMENTS

| | | | | |
|---|---|---|---|---|
| 10,854,960 | B2 * | 12/2020 | Bean | H02J 50/001 |
| 2009/0067208 | A1 * | 3/2009 | Martin | H02J 50/20 363/126 |
| 2012/0157026 | A1 * | 6/2012 | McKinzie | H01Q 9/0421 455/193.1 |
| 2013/0234536 | A1 * | 9/2013 | Chemishkian | H02J 50/40 307/149 |
| 2013/0285783 | A1 * | 10/2013 | Yussof | H01Q 7/005 336/138 |
| 2014/0084855 | A1 * | 3/2014 | Joshi | A61B 5/0031 320/108 |
| 2014/0306545 | A1 * | 10/2014 | Robertson | H02J 50/12 307/104 |
| 2015/0200568 | A1 * | 7/2015 | Takei | B60L 53/305 307/104 |
| 2018/0337547 | A1 * | 11/2018 | Menegoli | H02J 50/70 |
| 2018/0366981 | A1 * | 12/2018 | Liao | H02J 50/20 |

(Continued)

OTHER PUBLICATIONS

Lyu, et al, "A 13.56-MHz ?25-dBm-Sensitivity Inductive Power Receiver System-on-a-Chip with a Self-Adaptive Successive Approximation Resonance Compensation Front-End for Ultra-Low-Power Medical Implants," Downloaded on Jan. 14, 2021 at 12:19:20 UTC from IEEE Xplore, 12 pages.

(Continued)

*Primary Examiner* — Rexford N Barnie
*Assistant Examiner* — Joseph N Inge
(74) *Attorney, Agent, or Firm* — Berkeley Law & Technology Group, LLP

(57) ABSTRACT

Subject matter disclosed herein may relate to wireless energy harvesting and may relate more particularly to power-dependent tuning at energy-harvesting devices.

20 Claims, 7 Drawing Sheets

(56) References Cited

U.S. PATENT DOCUMENTS

| | | | | |
|---|---|---|---|---|
| 2020/0403451 | A1* | 12/2020 | Davlantes | H02J 50/20 |
| 2021/0184499 | A1* | 6/2021 | Huang | H02J 7/02 |

OTHER PUBLICATIONS

Myers, et al, "An 80nW Retention 11.7pJ/Cycle Active Subthreshold ARM Cortex-M0+ Subsystem in 65nm CMOS for WSN Applications," 2015 IEEE International Solid-State Circuits Conference, 978-1-4799-6224-2/15 IEEE, Downloaded on Aug. 6, 2021 at 12:21:51 UTC from IEEE Xplore, 3 pages.

Yoo, et al, "Theoretical and Experimental Development of 10 and 35 GHz Rectennas," IEEE Transactions On Microwave Theory and Techniques, vol. 40, No. 6. Jun. 1992, 8 pages.

Hammer, et al, "Comparison of different ultra-high-frequency transponder ear tags for simultaneous detection of cattle and pigs," Livestock Science187(2016)125-137, journal homepage: www.elsevier.com/locate/livsci, 14 pages.

* cited by examiner 1400
1404
Device
Sensors
1491
Time Reference Unit
1490
Communications Interface
1470
1468
1472
Memory
1466
Secondary Memory
1464
Primary Memory
Label Display
1473
Processing Unit
1460
1448
1406
Device
1408
1402
Device
Time Reference Unit
1450
1422
1426
Secondary Memory
Memory
1424
Primary Memory
1428
Communications Interface
1430
Processing Unit
1420
1440
Computer Readable Medium

DEVICE AND/OR METHOD FOR POWER-DEPENDENT TUNING FOR ENERGY HARVESTING

BACKGROUND

Field

Subject matter disclosed herein may relate to wireless energy harvesting and may relate more particularly to power-dependent tuning at energy-harvesting devices.

Information

Evolution of the so-called Internet-of-Things (IoT) is expected to deploy a great many (e.g., millions, billions, etc.) of devices including wireless and/or battery-less devices such as, for example, computational radio frequency identification (C-RFID) tags, battery-less sensors and/or the like. In particular implementations, processing circuits of such battery-less devices may be powered, at least in part, by radio frequency (RF) energy, light energy or acoustical energy, or a combination thereof, collected at the wireless and/or battery-less devices. Wireless and/or battery-less devices such as IoT-type devices may also receive signals and/or signal packets via amplitude-modulated wireless signals, such as amplitude-modulated RF signals. Harvesting energy from wireless signals and/or signal packets at wireless and/or battery-less devices may pose significant challenges.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1:
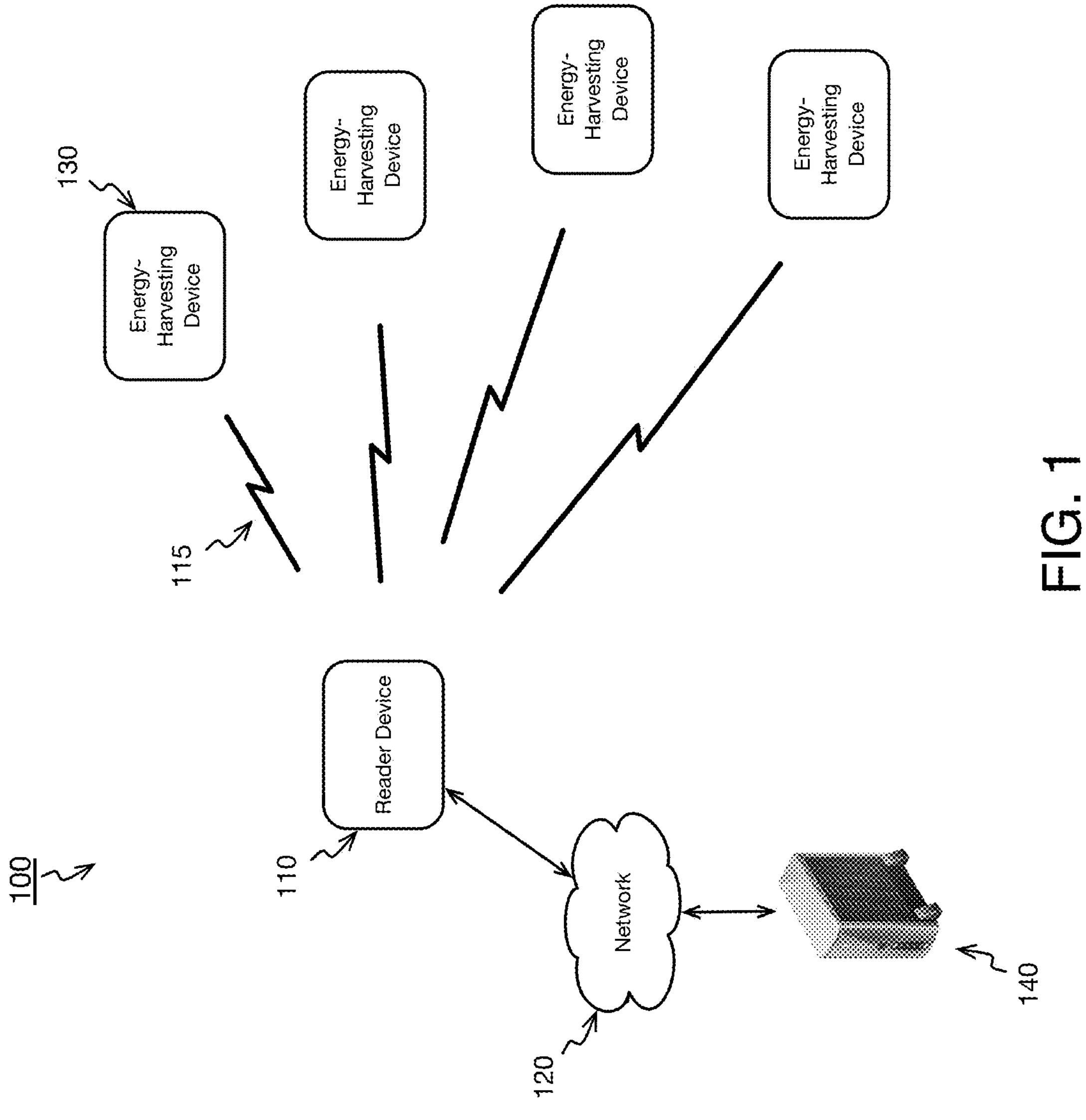
FIG. 1 is a system diagram illustrating certain features of a system containing one or more energy-harvesting devices, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

As mentioned, evolution of the so-called Internet-of-Things (IoT) is expected to deploy a great many (e.g., millions, billions, etc.) of devices including wireless and/or battery-less devices such as, for example, computational radio frequency identification (C-RFID) tags, battery-less sensors and/or the like. In particular implementations, processing circuits of such battery-less devices may be powered, at least in part, by radio frequency (RF) energy, light energy or acoustical energy, or a combination thereof, collected at the wireless and/or battery-less devices. Wireless and/or battery-less devices such as IoT-type devices may also receive signals and/or signal packets via amplitude-modulated wireless signals, such as amplitude-modulated RF signals. Harvesting energy from wireless signals and/or signal packets at wireless and/or battery-less devices may pose significant challenges, as explained more fully below.

FIG. 1 is a schematic diagram illustrating certain features of a system 100 containing a number of wireless and/or battery-less energy-harvesting devices 130, in accordance with an implementation. In the currently illustrated example, a reader device 110 may transmit RF signals 115, for example, to one or more energy-harvesting devices 130. In an implementation, the energy of RF signals 115 may be harvested, collected and/or stored, for example, at an energy-harvesting device 130. In some implementations, energy-harvesting device 130 may reflect and/or backscatter a portion of RF signals 115 back to reader device 110 and/or may modulate the reflected and/or backscattered portion of RF signals 115 to indicate particular detectable symbols and/or parameters (e.g., an identifier of an object associated with and/or co-located within an energy-harvesting device 130).

Additionally, energy-harvesting device 130 may harvest and/or collect energy received from RF signal 115 for use in powering one or more subsystems of energy-harvesting device 130 (e.g., one or more processors, microprocessors, memory, sensors, transceiver devices, display devices, etc., not shown). For example, energy-harvesting device 130 may include one or more antennas, resonating circuitry and/or structures, charge pumps, charge storage devices (e.g., capacitors) and/or the like to harvest and/or collect energy from at least a portion of RF signal 115 received at energy-harvesting device 130.

In an embodiment, reader device 110 and energy-harvesting device 130 may communicate bidirectionally. For example, reader device 110 may amplitude-modulate baseband signals and/or signal packets and may transmit amplitude-modulated wireless signals and/or signal packets (e.g., RF signal 115) to energy-harvesting device 130. Energy-harvesting device 130 may transmit messages to reader device 110 in an uplink signal. In one example, an uplink signal may comprise, for example, a signal indicating and/or expressing an identifier of a corresponding energy-harvesting device 130 and/or object co-located with such a corresponding energy-harvesting device 130. In an embodiment, an uplink signal may comprise a reflection of RF signal 115 that has been modulated with parameters and/or symbols to be detected and/or recovered at reader device 110. In particular implementations, reader device 110 and energy-harvesting devices 130 may exchange wireless signals and/or signal packets according to one or more signal messaging formats set forth in one or more ISO/IEC 18000 conventions, for example, although subject matter is not limited in scope in this respect. In other examples in which an energy-harvesting device 130 may comprise more advanced sensing and/or processing capabilities, uplink signals may comprise more robust messaging such as, for example, sensor measurements and/or values computed based, at least in part, on sensor measurements. Also, in an implementation, reader device 110 may comprise a single board computer hosting a real-time operating system (e.g., Linux) to enable, for example, Internet access (e.g., via network 120 and/or server computing device 140) and/or to perform device management.

As mentioned, a device, such as reader device 110, may transmit signals and/or signal packets to energy-harvesting device 130 via an amplitude-modulated wireless signal, such as RF signal 115. Baseband signals and/or signal packets transmitted via amplitude-modulated wireless signals (e.g., RF signal 115) may be demodulated at energy-harvesting device 130 to extract the baseband signals and/or signal packets. As explained more fully below, demodulation of an amplitude-modulated signal may include detecting rising and/or falling of an envelope of the amplitude-modulated signal (e.g., RF signal 115). Baseband signals and/or signal packets may be reconstructed at a receiving device (e.g., energy-harvesting device 130) based at least in part on the detected envelope of the amplitude-modulated signal, for example. As utilized herein, "baseband signal," "baseband signal packet" and/or the like refer to signals and/or signal packets communicated without modulation.

In some circumstances, demodulation of an amplitude-modulated wireless signal (e.g., RF signal 115) may pose challenges due at least in part to, for example, a power level at which reader device 110 transmits RF signal 115 and/or other factors including, for example, a range and/or distance between reader device 110 and energy-harvesting device 130, deviations from line-of-sight transmissions, presence of multi-path, presence of RF shadows from other energy-harvesting devices 130, movement of energy-harvesting devices 130, just to provide a few examples of such additional factors. For example, RF power may decay less over shorter distances and may decay to a greater degree over longer distances. Such differences in RF power and/or other circumstances may result in a variety of different envelope characteristics for amplitude-modulated wireless signals received at different energy-harvesting devices 130. It may prove challenging to design an envelope detector circuit to adequately and/or appropriately function over such varying circumstances, for example. Adding to the challenges of designing and/or implementing amplitude-modulated signal detection circuits is that energy-harvesting devices, such as energy-harvesting devices 130, may tend to be relatively simple, lower cost devices having relatively simple protocols and/or relatively simple circuits.

In the particular example depicted in FIG. 1, for simplicity of illustration system 100 includes multiple energy-harvesting devices 130 to receive an RF signal 115 from a single reader device 110. It should be understood that in other implementations, an energy-harvesting device 130 may communicate with and/or receive an RF signal from multiple different reader devices 110. Also, although particular example implementations discussed herein may be directed to use of RF signals, it should be understood that an RF signal is merely an example wireless signal type and that other implementations may utilize different types of wireless signals to communicate signals and/or signal packets. For example, in some implementations, amplitude-modulated wireless signals may comprise RF signals, light signals (e.g., infra-red) and/or acoustical signals, just to provide a few examples.

Herein, "transponder," "transponder device," "tag," "tag device," "receiver," "receiver device," "sensor," "sensor device," "RFID," "energy-harvesting device" and/or the like refer to a device having capabilities to harvest RF energy and/or to receive and/or demodulate amplitude-modulated wireless signals and/or signal packets. Herein, "transponder," "transponder device," "tag," "tag device," "receiver," "receiver device," "sensor," "sensor device," "RFID," "energy-harvesting device" and/or the like may be used interchangeably. In some implementations, a sensor device and/or energy-harvesting device may comprise an IoT-type device, although subject matter is not limited in scope in this respect. Also, herein, "transmitter," "transmitter device," "reader," "reader device" and/or the like refer to devices having a capability to transmit wireless signals and/or signal packets and/or to obtain acknowledgment of receipt of wireless signal packets from receiver devices. "Transmitter," "transmitter device," "reader," "reader device" and/or the like may be utilized interchangeably herein.

Further, in this context, "IoT-type device," "IoT-type devices" and/or the like refer to one or more electronic and/or computing devices capable of leveraging existing Internet or like infrastructure as part of the so-called "Internet of Things", or IoT, such as via a variety of applicable protocols, domains, applications, etc. IoT is typically a system of interconnected and/or internetworked physical devices in which computing may be embedded into hardware so as to facilitate and/or support devices' ability to acquire, collect, and/or communicate content over one or more communications networks, for example, at times, without human participation and/or interaction. In implementations, energy-harvesting devices 130 may comprise IoT-type devices, for example, that may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet devices, PCs, personal audio or video devices, personal navigation devices, and/or the like, to name a few non-limiting examples. In some implementations, energy-harvesting devices 130, including IoT-type devices, for example, may be capable of being uniquely identified via an assigned Internet Protocol (IP) address, as one particular example.

Figure 2:
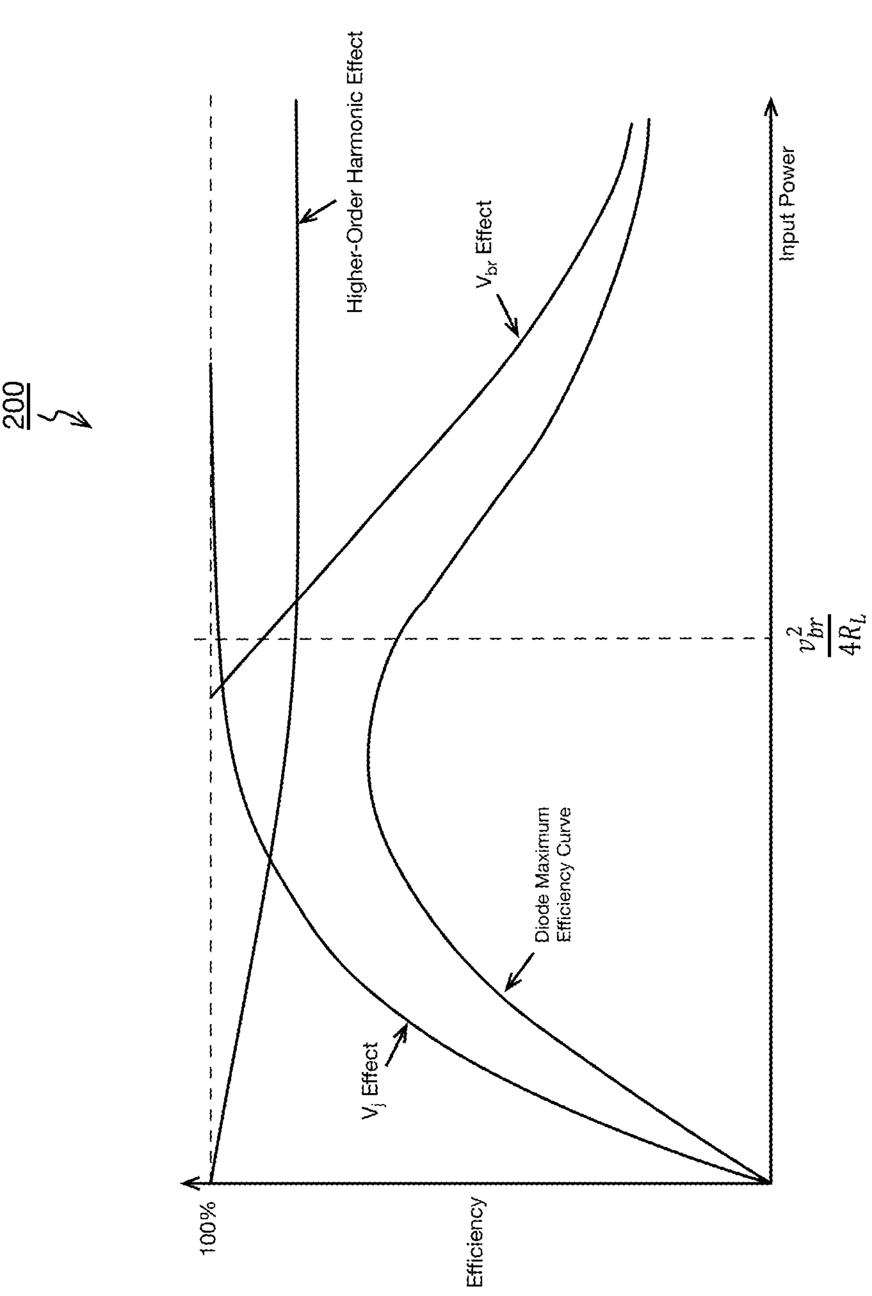
FIG. 2 is a diagram illustrating an example plot depicting example conversion efficiency vs wireless signal input power, according to an embodiment.
Figure 2:

FIG. 2 is a diagram illustrating an example plot 200 depicting example power conversion efficiency vs wireless signal input power. In some circumstances, approximate peak conversion efficiency in an energy-harvesting device, such as device 130, may be achieved over a relatively narrow range of operation. For example, for radio-frequency (RF) signals approximate peak conversion efficiency may be limited to a particular band of frequencies, particular input signal power conditions and/or converter circuit load conditions. Also, in some circumstances, a particular frequency and/or band of frequencies may be specified by particular standards and/or conventions. Example plot 200 illustrates example loss mechanisms that may reduce power conversion efficiency within an energy-harvesting device. The diode maximum efficiency curve may represent a summation of the various effects depicted in example plot 200.

For example, as depicted in example plot 200, to the left of a maximum efficiency point observed along the diode maximum efficiency curve, efficiency may be reduced in significant part due to forward junction voltage ($v_j$) effects for a diode and/or diode-connected metal-oxide semiconductor field-effect transistor (MOSFET) device within energy-harvesting device 130. To the right of the maximum efficiency point observed along the diode maximum efficiency curve of example plot 200 efficiency may be reduced in significant part due to reverse leakage (e.g., output voltage exceeding device voltage blocking limits). This may be particular true for circumstances in which a frequency of a wireless signal received at energy-harvesting device 130, for example, may exceed 10 Ghz. Of course, subject matter is not limited in scope in these respects.

For relatively lower frequency wireless signals (e.g., UHF signals of −900 MHz), reductions in power conversion efficiency observed to the right of the maximum efficiency point observable along the diode maximum efficiency curve of example plot 200 may be due in significant part to a combination of one or more of an output load mismatch, an input impedance mismatch arising from power variation in wireless signal received at energy-harvesting device 130 and/or reverse leakage voltage and/or other higher-order effects. For an output load (e.g., RL) mismatch, the effect may be relatively easily recovered by allowing more current draw at higher wireless signal input power levels. Further, reverse leakage and/or other higher-order effects may be relatively small and/or may incur relatively larger recovery overhead, for example.

With respect to input impedance mismatch arising from power variation in wireless signals received at energy-harvesting device 130, for example, a reactance characteristic of an input of a converter circuit of an energy-harvesting device, such as energy-harvesting device 130, may be varied based at least in part on a power characteristic of wireless signal received at the energy-harvesting device to compensate, at least in part, for an impedance mismatch between an antenna of the energy-harvesting device and the converter circuit.

Although example implementations discussed herein may relate more particularly to compensating, at least in part, for impedance mismatch between an antenna and a converter circuit of an energy-harvesting device, such as energy-harvesting device 130, other circumstances may include varying a wireless signal frequency (e.g., via antenna detuning) to compensate for frequency variation that may be induced, for example, by bovine and/or porcine body mass (e.g., RFID and/or computational-RFID (C-RFID) tags attached to the animals). However, such an approach may result in wireless signal readability issues at higher wireless signal input powers such as in circumstances wherein RFID-tagged animals may be closer to a reader device, such as reader device 110. This may be particular true for C-RFID tags, for example. Additionally, tuning antenna length in the field may be unlikely to scale for larger volumes of energy-harvesting devices and/or for diverse deployment conditions.

In other circumstances, for example, a self-adaptive resonance compensation approach may be utilized to improve wireless signal conversion efficiency. Such an approach may include successive approximation techniques that may provide quantized tuning of a resonance of a converter circuit, for example. However, such an approach may not address the issue of non-linear effects related to reactance-matching, for example.

Figure 3:
FIG. 3 is a diagram illustrating example simulated results showing efficiency gains from baseline via load tuning and by varying a reactance characteristic at an input of a converter circuit to compensate for an impedance mismatch between an antenna and the converter circuit, according to an embodiment.

FIG. 3 is a diagram illustrating example plot 300 depicting simulated power conversion efficiency gains from baseline (e.g., fixed-load impedance curve 330) via load tuning and/or by varying a reactance characteristic at an input of a converter circuit to compensate for an impedance mismatch between an antenna and the converter circuit. Example curve 330 may represent power conversion efficiency in circumstances having a relatively constant converter circuitry output load impedance (e.g., fixed load of 400 kOhm and fixed inductance of 124 nH). As may be seen from example curve 330, peak efficiency of approximately 33% may be observed at a wireless signal power of approximately −18 dBm. At lower wireless signal strengths (e.g., left of the peak efficiency point along example curve 330) and/or at higher wireless signal strengths (e.g., right of the peak efficiency point along example curve 330) power conversion efficiency may be significantly reduced.

In one approach to improving power conversion efficiency in an energy-harvesting device, such as energy-harvesting device 130, an output load impedance for a converter circuit of the energy-harvesting device may be varied in accordance with wireless signal input power. For example, as may be seen along example curve 320, a load impedance of 400 kOhm (e.g., fixed inductance L=124 nH) at an input power of −20 dBm may result in a power conversion efficiency of approximately 31%. Further, a load of 167 kOhm at an input power of −15 dBm may result in a power conversion efficiency of approximately 39%. A load impedance of 77 kOhm at an input power of −10 dBm may result in a power conversion efficiency of approximately 34% and a load impedance of 30 kOhm at an input power of −5 dBm may result in a power conversion efficiency of approximately 28%. Also, for example, a load impedance of 20 kOhm at an input power of 0 dBm may result in a power conversion efficiency of approximately 20%. Thus, it may be seen from example curves 330 and/or 320 of example plot 300 that efficiency gains may be realized via adjusting converter circuitry output load impedance in accordance with wireless signal input power.

However, additional (significant) gains may be realized in particular implementations by varying a reactance (e.g., inductance and/or capacitance) at an input of a power conversion circuit of an energy-harvesting device, such as energy-harvesting device 130, in accordance with a power characteristic of a wireless input signal to compensate, at least in part, for an impedance mismatch between an antenna and the power conversion circuit of the energy-harvesting device. In an implementation, an output impedance may also be varied. For example, as depicted at curve 310 of example plot 300, an inductance of 124 nH at an input power of −20 dBm may result in a power conversion efficiency of approximately 31%. Further, an inductance of 120 nH at an input power of −15 dBm may result in a power conversion efficiency of approximately 45%. An inductance of 116 nH at an input power of −10 dBm may result in a power conversion efficiency of approximately 43% and an inductance of 94 nH at an input power of 0 dBm may result in a power conversion efficiency of approximately 35%. Thus, it may be seen from example curves 330, 320 and/or 310 of example plot 300 that significant efficiency gains may be realized over both the constant output impedance/fixed inductance situation (e.g., curve 330) and the variable output impedance/fixed inductance situation (e.g., curve 320) by adjusting an impedance (e.g., variable inductance and/or capacitance) at an input to a converter circuit for an energy-harvesting device in accordance with wireless signal input power.

Figure 4:
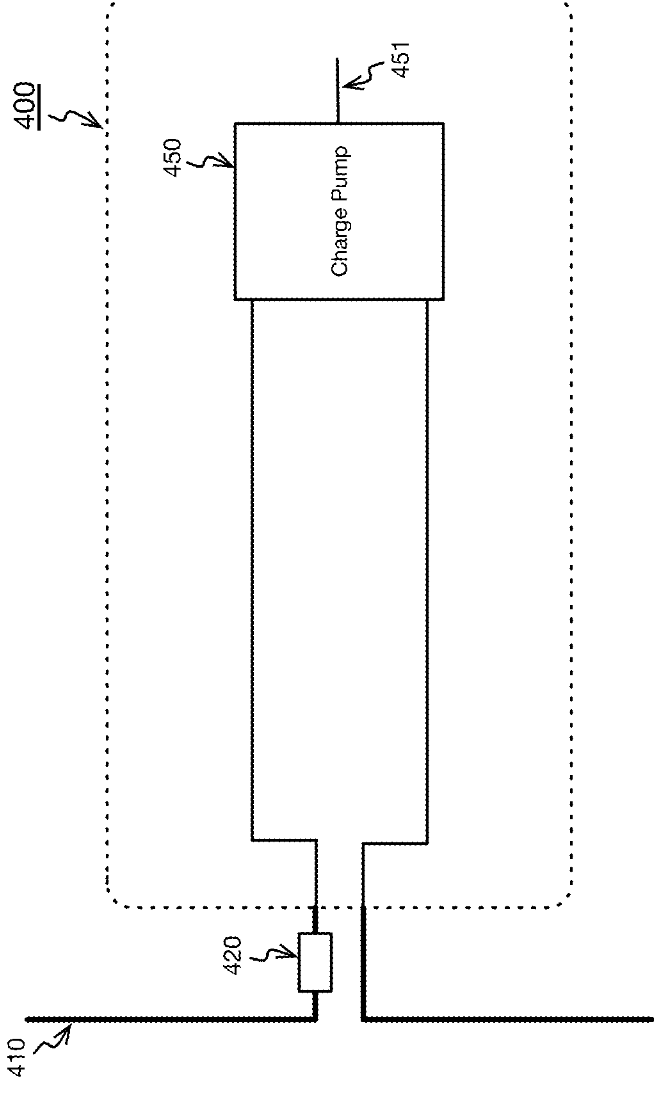
FIG. 4 is a schematic block diagram illustrating an example energy-harvesting device, according to an embodiment.

FIG. 4 is a schematic block diagram illustrating an example energy-harvesting device 400. In some circumstances, an energy-harvesting device, such as energy-harvesting device 400, may comprise an antenna 410 including an inductor 420. In some circumstances, inductor 420 may comprise a lumped inductor and/or may comprise an inductance distributed within an antenna design. Example energy-harvesting device 400 may also comprise a charge pump/converter 450 that may generate an output voltage signal 451 that may be utilized by various circuitry within energy-harvesting device 400. In contrast to example energy-harvesting device 500 discussed below, energy-harvesting device 400 may lack circuitry to adjust a reactance at the input to charge pump/converter 450 to match a reactance for antenna 410 for a given power level for a wireless signal received at antenna 410. For example, energy-harvesting device 400 may implement a relatively constant output signal (e.g., signal 451) load impedance that may correspond to example curve 330 of example plot 300 depicted in FIG. 3.

Figure 5:
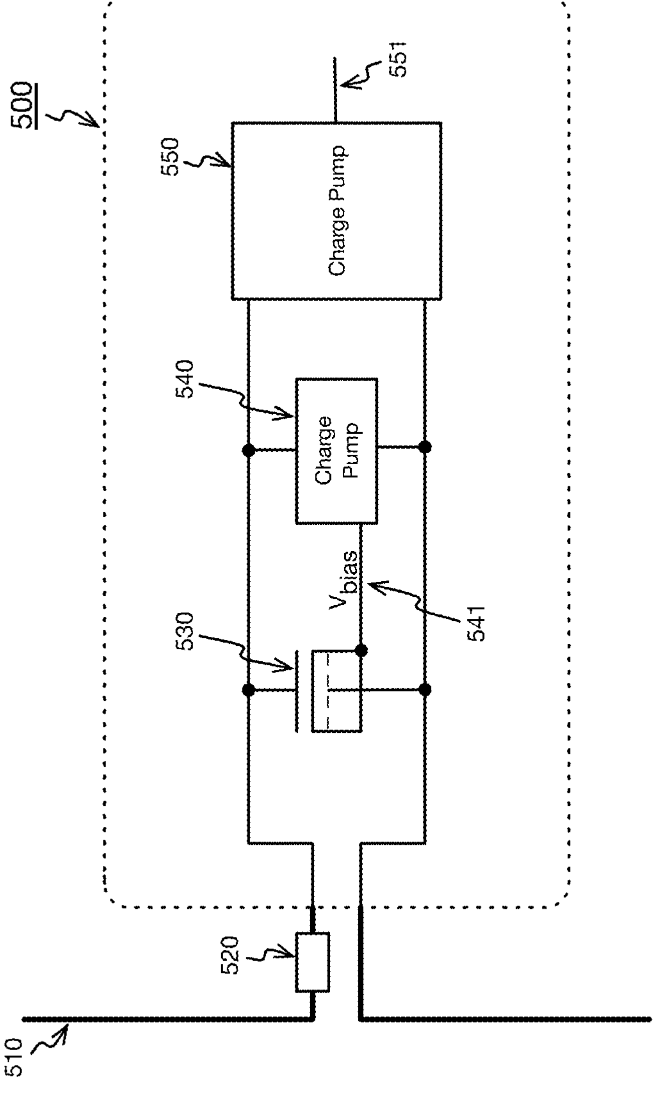
FIG. 5 is a schematic block diagram illustrating an example energy-harvesting device including circuitry to vary a reactance characteristic, in accordance with an embodiment.

FIG. 5 is a schematic block diagram illustrating an embodiment 500 of an example energy-harvesting device including circuitry to vary a reactance characteristic in accordance with a power level for a wireless signal received at energy-harvesting device 500. In an implementation, an energy-harvesting device, such as energy-harvesting device 500, may comprise an antenna 510 including an inductor 520. In particular implementations, inductor 520 may comprise a lumped inductor and/or may comprise an inductance distributed within the design of antenna 510. Example energy-harvesting device 500 may also comprise a charge pump/converter 550 that may generate an output voltage signal 551 that may be utilized by various circuitry within energy-harvesting device 500. In an implementation, various circuitry within energy-harvesting device 500 may be implemented as system-on-a-chip (SOC), although subject matter is not limited in scope in these respects.

In an implementation, energy-harvesting devices, such as energy-harvesting device 500, may include charge pump/power converter circuitry, such as charge pump 550, that may utilize non-linear devices whose effective reactance may change with an applied voltage (e.g., input power). As mentioned, power conversion efficiency may be significantly improved, particularly at higher wireless signal strengths, at least in part by varying a reactance (e.g., inductance reactance and/or capacitive reactance) at an input of a power conversion circuit (e.g., charge pump 550) in accordance with a power characteristic of a wireless input signal to compensate, at least in part, for an impedance mismatch between antenna 510 and charge pump/power conversion circuit 550 of energy-harvesting device 500.

For example, energy-harvesting device 500 may include circuitry, such as metal-oxide-semiconductor field-effect transistor (MOSFET) and/or varactor 530, whose capacitance (and therefore capacitive reactance) may change in accordance with an applied bias signal, such as bias signal 541. In an implementation, bias signal 541 may be generated by a charge pump, such as charge pump 540. In particular implementations, charge pump 540 may comprise a separate charge pump circuit from charge pump/converter 550. That is, in some implementations, a second charge pump may be utilized to provide a bias signal, such as bias signal 541, to a variable reactance device, such as MOSFET and/or varactor 530. In other implementations, a single multi-stage charge pump may be utilized to generate output signal 551 and also to provide bias signal 541 to a variable reactance device, such as MOSFET and/or varactor 530, for example.

Although energy-harvesting device 500 is depicted as employing MOSFET and/or varactor 530 as a variable reactance device, other implementations may utilize one or more inductors or capacitors, or a combination thereof, as variable reactance devices. In an implementation, a variable reactance device, such as MOSFET and/or varactor 530, may be utilized to change a reactance characteristic of charge pump/converter 550 to match a reactance (e.g., inductive reactance) of antenna 510 and/or inductor 520. For example, bias signal 541 may alter a capacitance of MOSFET and/or varactor 530 in accordance with a voltage across charge pump 540 which may combine with an inductance and/or capacitance of charge pump 550 to substantially match a reactance of antenna inductor 520. In an implementation, matching a reactance of inductor 520 with the combined effects of the capacitance of MOSFET and/or varactor 530 and the inductance and/or capacitance of charge pump 550 may substantially improve power conversion efficiency (e.g., see example curve 310 of example plot 300).

In an implementation, an increase in power conversion efficiency may result in more power available to energy-harvesting device 500 to perform more work and/or to store more energy in one or more capacitors and/or in one or more display elements, for example. For example, 3 mW of power may support three samples per second of a sensor signal whereas power sufficient to support thirteen samples per second may be generated in accordance with variable reactance implementations described herein. Also, for example, an increase in power conversion efficiency may also result in additional power that may be diverted to a display device, in an implementation. Of course, subject matter is not limited in scope in these respects.

In an implementation, bias signal 541 may be derived from a tap from a multi-stage charge pump, such as pump/converter 550, and/or may be provide by second charge pump, such as charge pump 540. In an implementation, bias signal 541 may comprise a substantially continuous signal and/or may comprise a periodic signal (e.g., clock signal). Again, subject matter is not limited in scope in these respects.

In implementations, changing a reactance characteristic of converter circuit, such as charge pump/converter 550, to match a reactance of antenna 510 and/or inductor 520 to address a mismatch in impedance between antenna 510 and/or inductor 520 and charge pump/converter 550 may yield significant gains in efficiency with few changes to circuitry. For example, an inspection of example energy-harvesting device 400 and example energy-harvesting device 500 may demonstrate that variable reactance circuitry may be accomplished, in an implementation, with one or more variable reactance (e.g., variable capacitance) devices, such as MOSFET and/or varactor 530, and/or a relatively small charge pump 540. Thus, by way of relatively few circuit devices, a significant increase in power conversion may be achieved.

Figure 6:
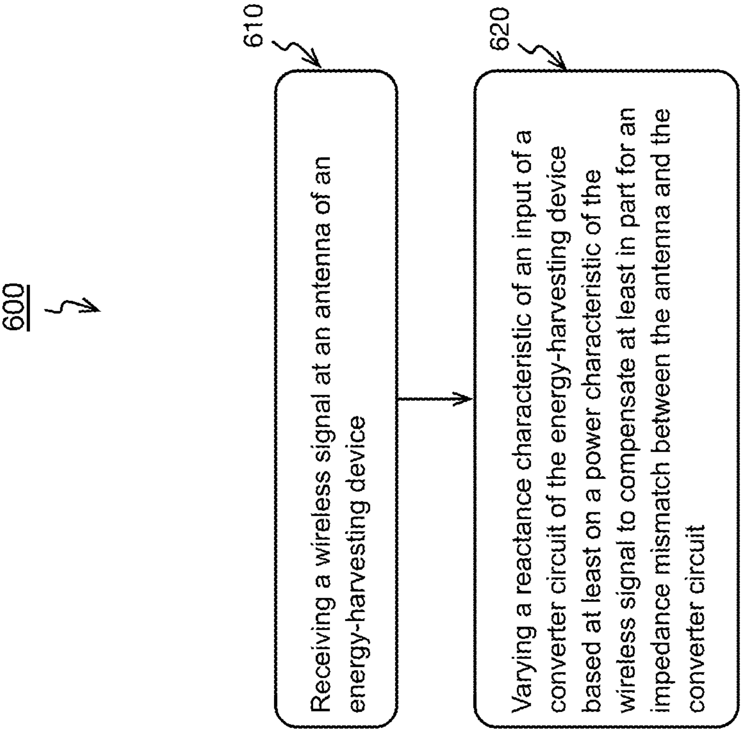
FIG. 6 is a flow diagram illustrating an example process for varying a reactance characteristic of an input of a converter circuit of an energy-harvesting device based at least in part on a power characteristic of a wireless signal received at the energy-harvesting device, in accordance with an embodiment.

FIG. 6 is a flow diagram illustrating an embodiment 600 of an example process for varying a reactance characteristic of an input of a converter circuit (e.g., charge pump/converter circuit 550) of an energy-harvesting device (e.g., energy-harvesting device 500) based at least in part on a power characteristic of a wireless signal. In a particular implementation, process 600 may include operations that may be performed in conjunction with example energy-harvesting device 500, for example. It should be noted that content acquired or produced, such as, for example, input signals, output signals, operations, results, etc. associated with example process 600 may be represented via one or more analog and/or digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As depicted at block 610, in an implementation, a wireless signal, such as an RF signal, may be received at an antenna (e.g., antenna 510) of an energy-harvesting device (e.g., energy-harvesting device 500). Also, in an implementation, a reactance characteristic of an input of a converter circuit, such as charge pump/converter 550, may be varied based at least in part on a power characteristic of a received wireless signal to compensate at least in part for an impedance (e.g., inductance) mismatch between an antenna (e.g., antenna 510 and/or inductor 520) and converter circuitry (e.g., charge pump/converter 550). In an implementation, varying a reactance characteristic of an input of a converter circuit (e.g., MOSFET and/or varactor 530) to compensate at least in part for an impedance mismatch between an antenna (e.g., antenna 510) and/or an inductor (e.g., inductor 520) and a converter circuit (e.g., converter circuit 550) may result in significantly improved efficiency, as mentioned above.

In an embodiment, an example process may include varying a reactance characteristic of an input of a converter circuit of an energy-harvesting device, wherein the energy-harvesting device includes an antenna and a converter circuit coupled to the antenna, and wherein the varying the reactance characteristic is based at least in part on a power characteristic of a wireless signal received at the antenna. In an implementation, varying the reactance characteristic of the input of the converter circuit may include varying a capacitance characteristic. Further, in an implementation, varying the reactance characteristic of the input of the converter circuit includes varying a reactance characteristic to compensate at least in part for an impedance mismatch between the antenna and the converter circuit arising at least in part from a variation of the power characteristic of the wireless signal.

Additionally, in an implementation, varying a reactance characteristic may include varying a reactance characteristic of a diode-coupled MOSFET. Also, for example, process 600 may include varying the reactance characteristic at least in part via a varactor. Further, process 600 may include varying the reactance characteristic including providing a bias signal from at least one charge pump of the converter circuit to circuitry to vary the reactance characteristic.

In an implementation, wherein varying a reactance characteristic includes providing a bias signal, such as bias signal 541, from at least one charge pump of the converter circuit to circuitry to vary the reactance characteristic. Also, in an implementation, wherein the at least one charge pump comprises a multi-stage charge pump. In an implementation, a wireless signal may comprise a radio-frequency (RF) signal. Also, for example, an energy-harvesting device 500 may comprise an RF device. In an implementation, energy-harvesting device 500 may comprise an RFID device and/or a C-RFID device.

Example embodiments may comprise an apparatus, such as an energy-harvesting device, for example. In an implementation, an energy-harvesting device may include circuitry to vary a reactance characteristic of an input of a converter circuit based at least in part on a power characteristic of a wireless signal. In an implementation, circuitry to vary a reactance characteristic of an input of a converter circuit may include circuitry to vary a capacitance characteristic. Also, in an implementation, circuitry to vary a reactance characteristic of an input of a converter circuit may vary a reactance characteristic to compensate at least in part for an impedance mismatch between an antenna and the converter circuit to arise at least in part from a variation of the power characteristic of the wireless signal, wherein the wireless signal is to be received at the antenna. Further, in an implementation, circuitry to vary a reactance characteristic may comprise a diode-coupled metal-oxide semiconductor field-effect transistor (MOSFET). In an implementation, circuitry to vary a reactance characteristic may comprise a varactor.

In an implementation, a converter circuit may comprise at least one charge pump to provide a bias signal to circuitry to vary a reactance characteristic. In an implementation, at least one charge pump may comprise a multi-stage charge pump.

In an implementation, a wireless signal may comprise a radio-frequency signal. Also, in an implementation, an energy-harvesting device may comprise a radio-frequency identification (RFID) device. In an implementation, an RFID device may comprise a computational RFID (C-RFID) device.

It should be noted that the various circuits disclosed herein may be described using computer aided design tools and expressed (or represented), as data and/or instructions embodied in various machine-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 7:
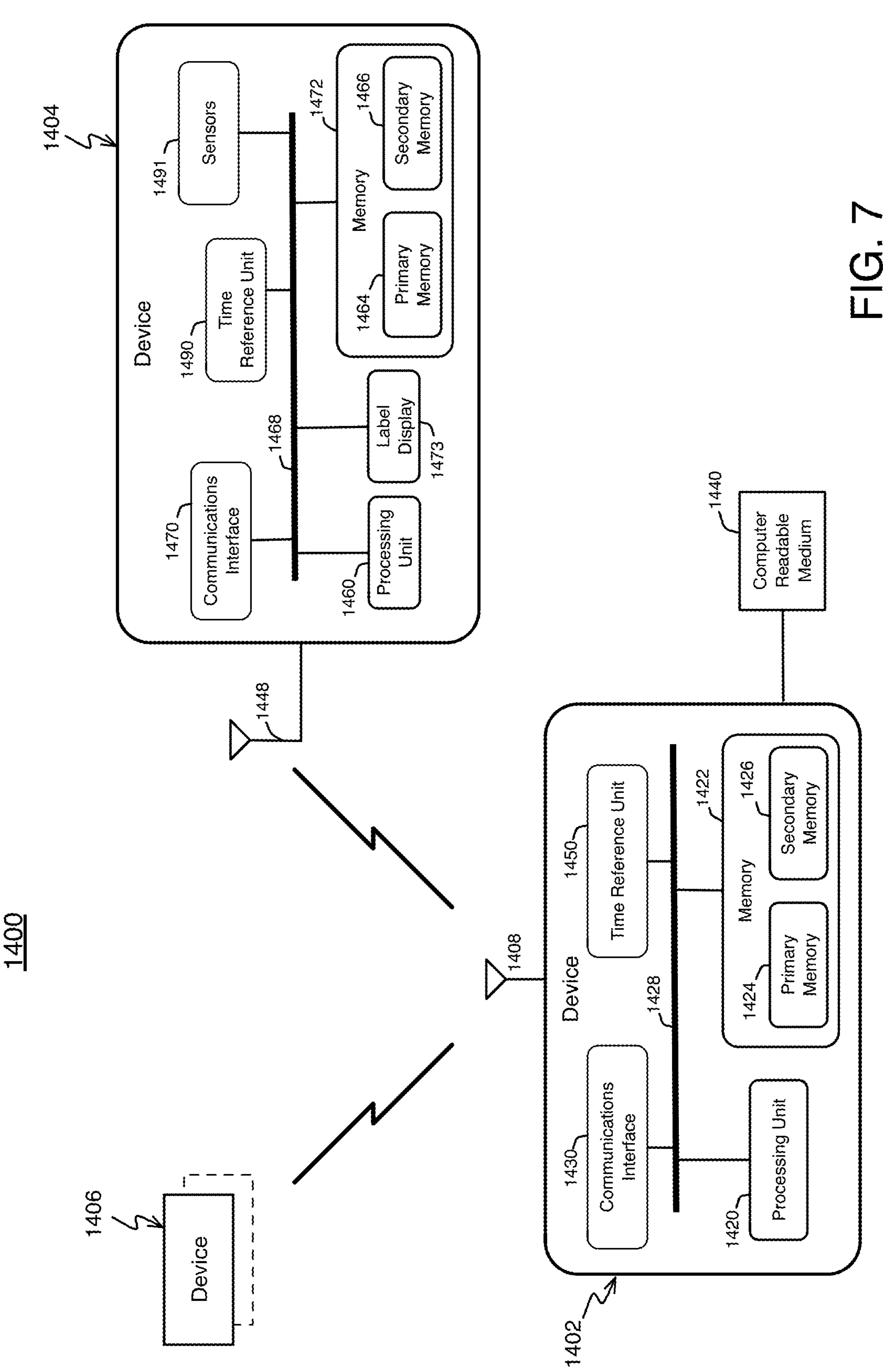
FIG. 7 is a schematic block diagram of an example computing system in accordance with an embodiment.

In example embodiments, as shown in FIG. 7, a system embodiment may comprise a local network (e.g., device 1402 and medium 1440) and/or another type of network, such as a computing and/or communications network. For purposes of illustration, therefore, FIG. 7 shows an embodiment 1400 of a system that may be employed to implement either type or both types of networks. A network may comprise one or more network connections, links, processes, services, applications, and/or resources to facilitate and/or support communications, such as an exchange of communication signals, for example, between a computing device, such as device 1402, and another computing device, such as 1404, which may, for example, comprise one or more client computing devices and/or one or more server computing device.

Example devices in FIG. 7 may comprise features, for example, of a computing devices to implement a reader device (e.g., reader device 110, FIG. 1) and/or an energy-harvesting device (e.g., energy-harvesting device 130, FIG. 1), in an embodiment. It is further noted that the term computing device, in general, whether employed as a client and/or as a server, or otherwise, refers at least to a processor and a memory connected by a communication bus. A "processor" or "processing unit," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-6 and in the text associated with the foregoing FIGS. 1-6 of the present patent application.

FIG. 7 is a schematic diagram illustrating an example system 1400 that may include one or more devices configurable to implement techniques or processes described above, for example, in connection with FIGS. 1-6. System 1400 may include, for example, a first device 1402, a second device 1404, and a third device 1406, which may be operatively coupled together through a wireless communications techniques described above.

First device 1402, second device 1404 and third device 1406, as shown in FIG. 7, may be representative of any device, appliance or machine that may be configurable to exchange signals and/or messages over a wireless communications network. By way of example but not limitation, any of first device 1402, second device 1404, or third device 1406 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1402, 1404, and 1406, respectively, may comprise one or more of a reader device or an energy-harvesting device in accordance with the examples described herein.

Similarly, a wireless communications network, as shown in FIG. 7, may be representative of one or more communication links, processes, or resources configurable to support the exchange of signals and/or messages between at least two of first device 1402, second device 1404, and third device 1406. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. In an embodiment, wireless communication links in a wireless communication link may enable one or more signal messaging formats set forth in one or more ISO/IEC 18000 conventions.

It is recognized that all or part of the various devices and networks shown in FIG. 7, and the processes and methods as further described herein, may be implemented using or otherwise including hardware, firmware, software, or any combination thereof.

Thus, by way of example but not limitation, first device 1402 may include at least one processing unit 1420 that is operatively coupled to a memory 1422 through a bus 1428. Likewise, second device 1404 may include at least one processing unit 1460 that is operatively coupled to a memory 1472 through a bus 1468.

Processing unit 1420 and/or processing unit 1460 may be representative of one or more circuits configurable to perform at least a portion of a computing procedure or process. By way of example but not limitation, processing unit 1420 and/or processing unit 1460 may include one or more processors, controllers, microprocessors, microcontrollers, application specific integrated circuits, digital signal processors, programmable logic devices, field programmable gate arrays, and the like, or any combination thereof.

Memory 1422 and/or memory 1472 may be representative of any mechanism for use in storing executable instructions, input/output values, parameters, measurements and/or symbols, etc. Memory 1422 may include, for example, a primary memory 1424 or a secondary memory 1426. Likewise, memory 1472 may include, for example, a primary memory 1464 or a secondary memory 1466. Primary memory 1424 and/or 1464 may include, for example, a random access memory, read only memory, non-volatile memory, etc. While illustrated in this example as being separate from processing unit 1420, it should be understood that all or part of primary memory 1424 may be provided within or otherwise co-located/coupled with processing unit 1420. Likewise, it should be understood that all or part of primary memory 1464 may be provided within or otherwise co-located/coupled with processing unit 1460. In a particular implementation, memory 1422 and processing unit 1420, and/or memory 1472 and processing unit 1460 may be configured to execute one or more aspects of process discussed above in connection with FIGS. 1-6.

Secondary memory 1426 and/or 1466 may include, for example, the same or similar type of memory as primary memory or one or more storage devices or systems, such as, for example, a disk drive, an optical disc drive, a tape drive, a solid state memory drive, etc. In certain implementations, secondary memory 1426 may be operatively receptive of, or otherwise configurable to couple to, a computer-readable medium 1440. Computer-readable medium 1440 may include, for example, any non-transitory medium that can carry or make accessible data, code or instructions for one or more of the devices in system 1400. Computer-readable medium 1440 may also be referred to as a storage medium.

First device 1402 may include a communication interface 1430 and second device 1404 may include a communication interface 1470 that provide for or otherwise supports an operative coupling of first device 1402 and second device 1404 at least through antennas 1408 and 1448. By way of example but not limitation, communication interface 1430 and/or 1470 may include a network interface device or card, a modem, a router, a switch, a transceiver, and the like. In other alternative implementations, communication interface 1430 and/or 1470 may comprise a wired/LAN interface, wireless LAN interface (e.g., IEEE std. 802.11 wireless interface) and/or a wide area network (WAN) air interface. In a particular implementation, communication interface 1430 and/or 1470 may include circuitry to enable an exchange of messages according to one or more signal messaging formats set forth in one or more ISO/IEC 18000 conventions. In a particular implementation, antenna 1408 in combination with communication interface 1430, and antenna 1440 in combination with communication interface 1470 may be used to implement transmission and reception of signals as illustrated in FIGS. 1-6.

According to an embodiment, second device 1404 may further comprise sensors 1491 which may comprise, for example, a light sensor and/or temperature sensor (e.g., embedded in a smart food label) capable of generating signals representative of measurements and/or observations of particular conditions. In addition, second device 1404 may comprise display label 1473 to display values computed at processing unit 1460. Display label 1473 may comprise, for example, via printed e-ink display. Such values displayed on and/or through display label 1473 may comprise values computed at processing unit 1460 based, at least in part, on signals representative of measurements and/or observations obtained from sensors 1491. Second device 1404 may also comprise circuitry and/or structures (not shown) for collecting and/or harvesting energy and/or power from a signal received at antenna 1448 (e.g., RF signal 115) such as, for example, charge pumps employing Dickson and/or cross-coupled doublers as described in "Power Supply Generation in CMOS Passive UHF RFID Tags," Alessio Facen and Andrea Boni, 2006 Ph.D. Research in Microelectronics and Electronics, IEEE Xplore, 11 Sep. 2006 and/or described in "Self-Biased Differential Rectifier With Enhanced Dynamic Range for Wireless Powering," Mahmoud H. Ouda, Waleed Khalil and Khaled N. Salama, IEEE Transactions on Circuits and Systems II: Express Briefs, Vol. 64, No. 5, May 2017, for example. As pointed out above, such energy collected and/or harvested from a signal received at antenna 1448 may be used for powering subsystems of second device 1404. Such subsystems of second device 1404 may include, for example, communication interface 1470, time reference unit 1490, sensors 1491, processing unit 1460, label display 1473 and/or memory 1472. It should be understood, however, that these are merely examples of subsystems of a device that may be powered based, at least in part, from energy harvested and/or collected from an RF signal received at an antenna, and claimed subject matter is not limited in this respect.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 7, first device 1402 and/or second device 1404 may provide one or more sources of executable computer instructions in the form physical states and/or signals (e.g., stored in memory states), for example. First device 1402 may communicate with second device 1404 by way of a network connection, such as by uplink and downlink signals, for example. As previously mentioned, a connection, while physical, may not necessarily be tangible. Although first and second devices 1402 and 1404 of FIG. 7 show various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1422 and/or 1472 may comprise any non-transitory storage mechanism. Memory 1422/1472 may comprise, for example, primary memory 1424/1464 and secondary memory 1426/1466, additional memory circuits, mechanisms, or combinations thereof may be used. Memory 1422 and/or memory 1472 may comprise, for example, random access memory, non-volatile memory, read only memory, etc., such as in the form of one or more storage devices and/or systems, such as, for example, a disk drive including an optical disc drive, a tape drive, a solid-state memory drive, etc., just to name a few examples.

Memory 1422 and/or 1472 may be utilized to store a program of executable computer instructions. For example, processor 1420 and/or processor 1460 may fetch executable instructions from memory and proceed to execute the fetched instructions. Memory 1422 may also comprise a memory controller for accessing device readable-medium 640 that may carry and/or make accessible digital content, which may include code, and/or instructions, for example, executable by processor 1420 and/or some other device, such as a controller, as one example, capable of executing computer instructions, for example. Under direction of processor 1420, a non-transitory memory, such as memory cells storing physical states (e.g., memory states), comprising, for example, a program of executable computer instructions, may be executed by processor 1420 and able to generate signals to be communicated via a network, for example, as previously described. Generated signals may also be stored in memory, also previously suggested.

Memory 1422 may store electronic files and/or electronic documents, such as relating to one or more users, and may also comprise a computer-readable medium that may carry and/or make accessible content, including code and/or instructions, for example, executable by processor 1420 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 7, processor 1420 and/or 1460 may comprise one or more circuits, such as digital circuits, to perform at least a portion of a computing procedure and/or process. By way of example, but not limitation, processor 1420 and/or 1460 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1420 and/or 1460 may perform signal processing, typically substantially in accordance with fetched executable computer instructions, such as to manipulate signals and/or states, to construct signals and/or states, etc., with signals and/or states generated in such a manner to be communicated and/or stored in memory, for example.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. An apparatus, comprising: an energy-harvesting device to include:

an antenna;

a converter circuit;

a variable reactance circuit electronically coupled to the converter circuit, wherein the variable reactance circuit is to vary a reactance characteristic in accordance with a bias signal provided by a bias signal generator circuit such that a combined reactance of the variable reactance circuit and the converter circuit substantially matches an inductive reactance of the antenna, wherein the bias signal is varied in accordance with a power level of a wireless signal received at the energy-harvesting device; and circuitry to vary an output impedance of the converter circuit at least in part in accordance with the power level of the wireless signal received at the energy-harvesting device.

2. The apparatus of claim 1, wherein the variable reactance circuit to include circuitry to vary a capacitance characteristic.

3. The apparatus of claim 1, wherein the variable reactance circuit is to vary the reactance characteristic to compensate at least in part for an impedance mismatch between the antenna and the converter circuit to arise at least in part from a variation of the power level of the wireless signal received at the energy-harvesting device.

4. The apparatus of claim 3, wherein the variable reactance circuit to comprise a diode-coupled metal-oxide semiconductor field-effect transistor (MOSFET).

5. The apparatus of claim 3, wherein the variable reactance circuit to comprise a varactor.

6. The apparatus of claim 1, wherein the converter circuit to comprise at least one charge pump to provide the bias signal to the variable reactance circuit.

7. The apparatus of claim 6, wherein the at least one charge pump to comprise a multi-stage charge pump.

8. The apparatus of claim 1, wherein the wireless signal to comprise a radio- frequency signal.

9. The apparatus of claim 8, wherein the energy-harvesting device to comprise a radio-frequency identification (RFID) device.

10. The apparatus of claim 9, wherein the RFID device to comprise a computational RFID (C-RFID) device.

11. A method, comprising:

receiving a wireless signal at an antenna of an energy-harvesting device;

varying a reactance characteristic of a variable reactance circuit of the energy-harvesting device in accordance with a bias signal provided by a bias signal generator circuit of the energy-harvesting device such that a combined reactance of the variable reactance circuit and a multi-stage converter circuit of the energy-harvesting device substantially matches an inductive reactance of the antenna, wherein the bias signal is varied in accordance with a power level of the wireless signal; and varying an output impedance of the converter circuit in accordance with the power level of the wireless signal.

12. The method of claim 11, wherein the varying the reactance characteristic of the variable reactance circuit includes varying a capacitance characteristic.

13. The method of claim 11, wherein the varying the reactance characteristic of the variable reactance circuit includes varying the reactance characteristic to compensate at least in part for an impedance mismatch between the antenna and the converter circuit arising at least in part from a variation of the power level of the wireless signal.

14. The method of claim 13, wherein the varying the reactance characteristic includes varying the reactance characteristic at least in part via a diode-coupled metal-oxide semiconductor field-effect transistor (MOSFET) of the variable reactance circuit.

15. The method of claim 13, wherein the varying the reactance characteristic includes varying the reactance characteristic at least in part via a varactor.

16. The method of claim 11, wherein varying the reactance characteristic includes providing the bias signal from at least one charge pump of the converter circuit to the variable reactance circuit.

17. The method of claim 16, wherein the at least one charge pump comprises a multi-stage charge pump.

18. The method of claim 11, wherein the wireless signal comprises a radio-frequency signal.

19. The method of claim 18, wherein the energy-harvesting device comprises a radio-frequency identification (RFID) device.

20. The method of claim 19, wherein the RFID device comprises a computational RFID (C-RFID) device.

* * * * *